3,261,732
AQUEOUS SLURRY BLASTING AGENT CONTAINING ALUMINUM AND AN ACETIC ACID-ZINC OXIDE STABILIZER

Clyde W. Eilo, Succasunna, N.J., assignor to Hercules Incorporated, a corporation of Delaware
No Drawing. Filed June 18, 1964, Ser. No. 376,240
12 Claims. (Cl. 149—38)

This invention relates to a novel aqueous slurry blasting agent and more particularly, to a noval aqueous slurry blasting agent which is stable when particulate aluminum is present.

The art for the manufacture of gelled aqueous slurry explosives or blasting agents is well known. Also, it is well known that gelled aqueous slurries containing aluminum present problems in respect to stability in storage. Gelled aluminized aqueous slurries at normal storage (80° F.) and elevated temperatures (120° F.) begin to deteriorate after several days. The pH rises, the gel begins to break down, syneresis occurs (exuding of water from the gel), and gassing occurs until after a short time, the gel is completely broken, and the ingredients become segregated. Thus, it is necessary to inhibit the reactivity of the aluminum with chemical stabilizers, and, for example, phosphate inhibitors employed in small amount have been found useful for this purpose. However, the art is constantly in quest of further improvements in the manufacture and stability of aqueous slurry explosives containing aluminum, and the present invention is directed to such an improvement.

Accordingly, a principal object of the present invention is to provide novel aqueous blasting agents containing aluminum which are stable over long periods of storage.

Other objects of the invention will appear hereinafter, the novel features and combinations being set forth in the appended claims.

Generally described, the present invention contemplates the preparation of an aqueous slurry blasting agent comprising a sensitizing agent, inorganic nitrate oxidizing salt, particulate aluminum, water, and a stabilizer for maintaining the pH of the slurry from about 5 to about 7 consisting essentially of a small amount of acetic acid and zinc oxide.

The examples given in the following table will serve to illustrate the compositions of the invention as well as their method of preparation. All parts and percentages are by weight.

With reference to the following table, it will be seen that all the aluminized products were remarkably stable, and it will be appreciated that the physical nature and consistency of the blasting agents set forth will vary somewhat depending upon the precise formulation in each instance. This, of course, is generally advantageous since it permits "tailoring" of the compositions to fit conditions for use in the field. It will be appreciated that field conditions may dictate the addition of ingredients such as sulfur, ferrosilicon, ferrophosphorous and the like, which are well known in the art and contemplated within the purview of the invention. Moreover, aqueous slurry blasting agents in accordance with the prior art become quite firm and lose their flow properties at about 0° F. and tend to freeze at temperatures about −14° F. Accordingly, the inclusion of additional ethylene glycol up to about 20% by weight of the composition as a freezing agent depressant is contemplated within the purview of the invention. As presented in the examples, the ethylene glycol was used as a dispersing agent for the guar gum. The pine oil was added as a defoamer to increase the density of the composition, and the initial addition of a small amount of the solid ingredients in the mix served to aid in dispersing the guar gum and prevent lumping. Also, it will be noted with reference to Example 8 that this invention can be practiced in the absence of a gelling agent, although the gelled aqueous slurry blasting products are preferred in view of their versatility.

The sensitizing agents which may be used in accordance with the present invention include smokeless powder, TNT, RDX, PETN, Pentolite, Cyclotol, HBX, the "tols" and the like. These materials may be pelleted, flaked, grained and ground when desired and used in an amount of from about 10 to about 40% and preferably from about 20 to about 35%.

The inorganic nitrate oxidizing salt is ammonium nitrate and includes sodium and other nitrate salts, which are used as strength and/or oxygen donors for the compositions. The salts are used in an amount of from about 10 to about 50 percent and from about 5 to about 30 percent and preferably from about 15 to about 38 percent and preferably from about 7 to about 16 percent, respectively.

The guar gum gelling agent is a galactomannan substance and may be of the inhibited or uninhibited, and self-complexing, types with the gum present in an amount of from about 0.2 to about 5% and preferably from about 0.4 to about 2%. Other gelling agents such as CMC (carboxymethylcellulose), Natrosol (water-soluble hydroxyethyl cellulose), and the polyacrylamides may be used, however, in the ranges given for guar gum.

The water content of the compositions is important in determining the consistency, the amount of solution in the formula (which controls freezing characteristics), and the amount of ethylene glycol as desired to be added to the composition. Consistency of the product is important for economical packaging, and for proper use of the slurry in blasting. The softness of consistency is greatly dependent on the solid to liquid ratio, and, therefore, the percent water in the mix. The amount of water present may be from about 8 to about 25% and preferably from about 14 to about 22%.

The percentage of aluminum used is determined by the strength desired in the ultimate composition. The aluminum is utilized in particulate form and may be varied in amount from about 5 to about 40%, and preferably is present in an amount of from about 7 to about 20%.

The stabilizer for maintaining the pH of the slurry from about 5 to about 7, which has been found essential, consists essentially of acetic acid and zinc oxide incorporated in very small amount for most formulations. On a glacial acetic acid basis, the amount of acetic acid ranges from about 0.01 to about 0.10%. If dilute acetic acid is used, the percentages will, of course, be increased accordingly. The amount of zinc oxide generally used is from about 0.03 to about 0.20%. Since some grained ammonium nitrate is manufactured by adding about 0.1% zinc oxide to the nitrate when it is being crystallized, an additional

TABLE

| Example | 1 | 2 | 3 | 4 | 5 | 6 | 7 | 8 |
|---|---|---|---|---|---|---|---|---|
| Water | 16.0% | 16.0% | 16.0% | 20.0% | 18.0% | 18.0% | 20.0% | 22.5% |
| Smokeless powder: | | | | | | | | |
| 1.1″ Sgle. Base [a] | 30.0 | 30.0 | 30.0 | | 30.0 | 30.0 | 30.0 | 25.0 |
| 40 mm. Sgle. Base [b] | | | | 15.0 | | | | |
| 20 mm. Sgle. Base [b] | | | | 15.0 | | | | |
| TNT all through 20 mesh | 20.0 | | | | | | | |
| Ammonium nitrate: | | | | | | | | |
| Prills [d] | 38.1 | 30.2 | 31.9 | 20.2 | 17.0 | 21.9 | 20.3 | 25.9 |
| Grained [e] | 9.0 | 7.0 | 7.0 | 14.0 | 15.9 | 13.5 | 13.5 | 15.0 |
| Sodium nitrate: Fine [f] | | | | | | | | |
| Guar gum: [g] | | | | | | | | |
| [h] | 1.3 | 1.2 | 1.0 | 1.0 | 1.0 | 1.0 | 0.6 | |
| [i] | | | | 0.2 | | | | |
| [j] | | | | 14.0 | 18.0 | | | |
| Aluminum [k] | 14.0 | 14.0 | 14.0 | 0.1 | | 14.0 | 14.0 | 10.0 |
| Pine oil | 0.1 | 0.1 | 0.1 | | | 0.1 | 0.1 | 0.1 |
| Ethylene glycol | 1.5 | 1.5 | | | | | 1.5 | 1.5 |
| Acetic acid | 0.01 | 0.01 | 0.02 in AN | 0.01 | 0.01 | 0.033 | 0.033 | 0.04 |
| | 0.03 in AN | 0.03 in AN | 0.03 in AN | 0.20 | 0.03 in AN | 0.033 | 0.033 | 0.04 |
| Zinc oxide | 5.8 | 6.0 | | 6.0 | 5.5 | 5.8 | 5.8 | 5.2 |
| pH | | | | | | | | |
| Density (gm./cc.) | 1.42 | 1.46 | | | | 1.45 | 1.45 | 1.42 |
| Mixing Procedure (numbered step wide) | (1) Add water and pine oil. (2) Add ⅔ guar gum and 0.1 ingredients. Pregel 1–2 minutes. (3) Add glycol. (4) Add remaining ingredients and ⅓ guar gum (add acid). (5) Add smokeless powder or TNT—aluminum. | Pregel 1–2 | Mixing procedure same as Examples 1 and 2. | (1) Add water, pine oil, zinc oxide sodium nitrate, guar gum pregel. (2) Add ammonium nitrate, smokeless powder (add acid). (3) Add guar gum.[j] | Mixing procedure same as Examples 1 and 2. | (1) Add water, smokeless powder, zinc oxide. (2) Add ⅔ prills—guar gum in glycol. (3) Add sodium nitrate and prills. (4) Add aluminum. (5) Add acetic acid. | | |
| Stability in storage | Well crosslinked. pH after 1 day 5.4, after 37 days storage at 120° F., no gassing. | Well crosslinked. pH after 1 day 5.6, after 37 days storage at 120° F., no gassing. | After 1 day pH 5.5, storage 2 wks. to 4 wks., no gassing. | After 1 wk. pH 5.7, no gassing. | After 8 days pH 5.5, no gassing. After 30 days pH 5.5, no gassing. | After 1 day pH 5.8, no gassing. | After 1 day pH 5.8, no gassing. | After 1 day pH 5.8, no gassing. |
| Shooting Results (3″ x 28″ pipe under water), m/sec.: | | | | | | Shooting Results (5″ diameter hole unconfined under water), m/sec. | | |
| 160 gm.[l] booster | 5,000 | 5,240–5,000 | 5,320 | 4,780 | | 5,000* | 5,000* | 4,650,* |
| 40 gm. booster [l] | 5,080 | | 5,240 | | | | *400 gms. Pentolite.[m] | |

[a] Length 0.1″, width 0.04″ perforations—1.
[b] Length 0.1″, width 0.12″ perforations—7.
[c] Length 0.3″, width 0.08″ perforations—1.
[d] All on 20 mesh.
[e] <5% on 40 mesh (contains 0.1% zinc oxide).
[f] <7% on 20 mesh.
[g] >99% through 60 mesh.
[h] Inhibited <[i], self-complexing.
[i] Inhibited, self-complexing.
[j] Noninhibited, nonself-complexing.
[k] All through 50 mesh.
[l] 59.5% RDX, 39.5% TNT, 1.0% wax.
[m] 50% PETN, 50% TNT.

add of zinc oxide is usually not necessary but may be added if the pH tends to drift upward. Also, since no zinc oxide is present in prills, an appropriate amount must be added, which has been found to be from about 0.03 to about 0.5%. In actual practice, the precise amount of acetic acid and zinc oxide to be utilized is determined by adjusting to a pH of from about 5 to about 7 and observing that there is no appreciable upward drift of the pH during storage of the composition.

The method of addition of ingredients is set forth in the table. The most important step in the overall procedure is to add the acetic acid and zinc oxide (when required) before the slurry becomes too thick so that thorough and intimate dispersal of these ingredients as the stabilizing agent is accomplished. When guar gum or other gelling agent is to be utilized, it should be added to the water and hydrated before the solid ingredients are added. This forms a sol of sufficient viscosity to suspend the solid ingredients. When ethylene glycol is to be utilized, it should be added before the salts so that proper dispersal of the ethylene glycol in water will take place.

The advantages of the invention are multifold. The acetic acid/zinc oxide combination stabilizes the pH of aluminized slurries below 7.0 where the aluminum gassing reaction is most inhibited. The buffer range of acetic and zinc oxide (5.0–7.0) is the level most suited for proper action of the gelling agent, which binds the slurry in a tight gel. Because the gassing reaction of aluminum is inhibited, aluminized slurries can be safely stored, even at elevated temperatures, for extended periods. The buffering effect of acetic acid/zinc oxide prevents drifting of the pH after extended storage.

It will be seen, therefore, that this invention may be carried out by the use of various modifications and changes without departing from its spirit and scope with only such limitations placed thereon as are imposed by the appended claims.

What I claim and desire to protect by Letters Patent is:
1. An aqueous slurry blasting agent comprising
   (a) a sensitizing agent,
   (b) inorganic nitrate oxidizing salt,
   (c) particulate aluminum,
   (d) water, and
   (e) a stabilizer for maintaining the pH of the slurry from about 5 to about 7 consisting essentially of a small amount of acetic acid and zinc oxide.
2. The aqueous slurry blasting agent of claim 1 in which the stabilizer consists essentially of at least about 0.01% acetic acid and at least about 0.03% zinc oxide by weight of the composition.
3. The aqueous slurry blasting agent of claim 1 in which the stabilizer consists essentially of from about 0.01 to about 0.1% acetic acid and from about 0.03 to about 0.5% zinc oxide by weight of the composition.
4. A gelled aqueous slurry blasting agent comprising
   (a) a sensitizing agent,
   (b) an inorganic nitrate oxidizing salt,
   (c) from about 5 to about 40% of particulate aluminum,
   (d) gelling agent,
   (e) water, and
   (f) a stabilizer consisting essentially of at least about 0.1% acetic acid and at least about 0.3% zinc oxide at a pH of from about 5 to about 7 for the final composition, all percentages by weight of the final composition.
5. A gelled aqueous slurry blasting agent comprising by weight.
   (a) from about 10 to about 40% of a sensitizing agent,
   (b) from about 10 to about 50% of ammonium nitrate,
   (c) from about 5 to about 30% of sodium nitrate,
   (d) from about 0.2 to about 5% of gelling agent,
   (e) from about 5 to about 40% of particulate aluminum,
   (f) from about 8 to about 25% of water, and
   (g) a stabilizer consisting essentially of at least about 0.01% acetic acid and at least about 0.03% zinc oxide at a pH of from about 5 to about 7 for the final composition, all percentages by weight of the final composition.
6. A gelled aqueous slurry blasting agent comprising by weight
   (a) from about 20 to about 35% of a sensitizing agent,
   (b) from about 15 to about 38% of ammonium nitrate,
   (c) from about 7 to about 16% of sodium nitrate,
   (d) from about 0.4 to about 2% of guar gum gelling agent,
   (e) from about 7 to about 20% of particulate aluminum,
   (f) from about 14 to about 22% of water, and
   (g) a stabilizer consisting essentially of from about 0.01 to about 0.1% acetic acid and from about 0.03 to about 0.5% zinc oxide at a pH of from about 5 to about 7 for the final composition, all percentages by weight of the final composition.
7. The gelled aqueous slurry blasting agent of claim 5 in which the sensitizing agent is smokeless powder.
8. The gelled aqueous slurry blasting agent of claim 5 in which the sensitizing agent is TNT.
9. The gelled aqueous slurry blasting agent of claim 6 in which the sensitizing agent is smokeless powder.
10. The gelled aqueous slurry blasting agent of claim 6 in which the sensitizing agent is TNT.
11. A stabilizer for a gelled aqueous slurry blasting agent containing aluminum consisting essentially of a small amount of acetic acid and zinc oxide for maintaining the pH of the slurry from about 5 to about 7.
12. A stabilizer for a gelled aqueous slurry blasting agent containing aluminum consisting essentially of at least about 0.01% acetic acid and at least about 0.03% zinc oxide by weight of the composition for maintaining the pH of the slurry from about 5 to about 7.

References Cited by the Examiner
UNITED STATES PATENTS

| | | | |
|---|---|---|---|
| 3,121,036 | 2/1964 | Cook et al. | 149—44 X |
| 3,153,606 | 10/1964 | Breza et al. | 149—41 |
| 3,160,538 | 12/1964 | Zaslowsky | 149—43 |
| 3,214,307 | 10/1965 | Logan et al. | 149—41 |

LEON D. ROSDOL, *Primary Examiner.*

B. R. PADGETT, *Assistant Examiner.*

UNITED STATES PATENT OFFICE
CERTIFICATE OF CORRECTION

Patent No. 3,261,732                          July 19, 1966

Clyde W. Eilo

It is hereby certified that error appears in the above numbered patent requiring correction and that the said Letters Patent should read as corrected below.

Column 2, line 2, for "freezing agent" read -- freezing point --; column 3, in the TABLE, first column, line 23 thereof, for "stepwide" read -- stepwise --; column 6, line 2, for "0.3%" read -- 0.03% --.

Signed and sealed this 1st day of August 1967.

(SEAL)
Attest:

Edward M. Fletcher, Jr.                          EDWARD J. BRENNER

Attesting Officer                                Commissioner of Patents